United States Patent Office 3,524,900
Patented Aug. 18, 1970

3,524,900
SURFACE TREATING COMPOSITIONS
Robert Muir Gibbon, West Kilbride, and Edward Keith Pierpoint, Largs, Scotland, assignors to Imperial Chemical Industries Limited, London, England, a corporation of Great Britain
No Drawing. Filed May 22, 1967, Ser. No. 640,360
Claims priority, application Great Britain, May 31, 1966, 24,226/66
Int. Cl. C08g 47/02; D21h 1/28
U.S. Cl. 260—825
10 Claims

ABSTRACT OF THE DISCLOSURE

Rapid curing compositions particularly suitable for paper treatment comprise a hydroxy ended diorganopolysiloxane, a mono-organopolysiloxane, an amino-alkoxy silicon compound and a tin curing agent in a solvent.

This invention relates to new and useful surface-treating compositions and more particularly to such compositions based on organopolysiloxanes.

A wide variety of compositions suitable for use in surface treatments of materials such as woven, felted or knitted fabrics of natural or synthetic fibres and which are based on organopolysiloxanes are known and are readily available. For some of these applications including the treatment of paper it is desirable, inter alia, that that compositions used should have a rapid rate of cure at not too high a temperature and should be resistant to removal by abrasion immediately after curing. While many compositions are available which given a rapid cure, the hitherto available compositions, especially when applied to paper, have had little resistance to removal by abrasion immediately after curing although such resistance has in some cases developed later.

An object of the present invention is to provide a composition which can be cured rapidly at not too elevated a temperature. Another object is to provide such a composition which when applied to a surface and cured is resistant to removal by abrasion and gives a harder film than hitherto. A further object is to provide a process for treating surfaces, and more particularly paper surfaces, with such a composition.

According to the present invention these objects are accomplished by a composition comprising 100 parts by weight of a diorganopolysiloxane having at least 2 hydroxyl groups attached to different silicon atoms per molecule and of viscosity not less than 3000 cs. at 25° C., 1 to 20 parts by weight of a mono-organopolysiloxane of viscosity not greater than 1000 cs. at 25° C., 1 to 20 parts by weight of an aminoalkoxy silicon compound and 5 to 20 parts by weight of an organotin acylate in an organic solvent.

It is preferred in some cases, for example, when maximum ease of release is required, that the viscosity of the diorganopolysiloxane be not less than 500,000 cs. at 25° C. If there are present, as there may be, more than 2 hydroxyl groups per molecule, 2 or more of these may be attached to the same silicon atom always provided that there are at least 2 hydroxyl groups attached to different silicon atoms. It is also preferred that there be a hydroxyl group attached to each terminal silicon atom in the chain.

The diorganopolysiloxane while consisting essentially of diorganosiloxanyl units may also contain a small proportion of trifunctional silicon atoms attached to a single organo group provided the amount of such is not sufficient to destroy the solubility of the diorganopolysiloxane in the chosen organic solvent. The organo groups in the diorganopolysiloxane may be alkyl, aryl, aralkyl, alkaryl, alkenyl, cycoakyl or cycloalkenyl groups or such groups containing a variety of substituents such as halogens or cyano groups. Suitable groups include, for example, methyl, ethyl, phenyl, vinyl, cyclohexyl, 3,3,3-trifluoropropyl and chlorophenyl groups. In many cases it is preferred that at least the major proportion and, in some cases all, of the organo groups, are methyl groups.

The mono-organopolysiloxane is normally preferably used in amount not less than 3 parts by weight. It may be linear or cyclic or contain a proportion of both. The mono-organopolysiloxane may, if desired, also contain a proportion, preferably not more than a minor proportion, of diorganosiloxanyl units, but should contain at least one silicon-bonded hydrogen atom for every three silicon atoms.

If linear it may be terminated by, for example, triorganosilyl, diorganosilyl or diorganohydroxysilyl groups.

The organo groups in the mono-organopolysiloxane may be alkyl, aryl, aralkyl, alkaryl, alkenyl or cycloalkenyl groups. Suitable groups which may be used include, for example, methyl, ethyl, phenyl, tolyl, benzyl and vinyl groups. Preferred siloxanes are those consisting of methylsiloxanyl units terminated by trimethylsilyl groups.

The aminoalkoxy silicon compound is preferably used in amount from 3 to 10 parts by weight. The aminoalkoxy silicon compound may be any silicon compound having one or more of the groups (R'R''N.R—) attached to one or more silicon atoms through an oxygen atom, where R is an alkylene group or consists of alkylene groups joined by one or more —NR'''— groups or oxygen atoms and the oxygen atom attached to silicon and the essential nitrogen atom being attached to different carbon atoms and R' and R'', which may or may not be the same, are hydrogen or alkyl, cyclo-alkyl, amino-alkyl or hydroxy-alkyl groups, a monovalent group consisting of alkylene and alkyl groups joined by one or more —NR'''— groups or oxygen atoms or alternatively R' and R'' together form a single alkylene group or a group consisting of alkylene groups joined by one or more —NR'''— groups or oxygen atoms and R''' is hydrogen or an alkyl group having not more than 5 carbon atoms. It is preferred that R be —CH₂CH₂— or —CH₂CH(Et)— and that R' and R'' be hydrogen, methyl or ethyl groups. Because of low cost and availability, the most generally preferred group is NH₂CH₂CH₂—.

Suitable groups which may be attached to a silicon atom through an oxygen atom include, for example,

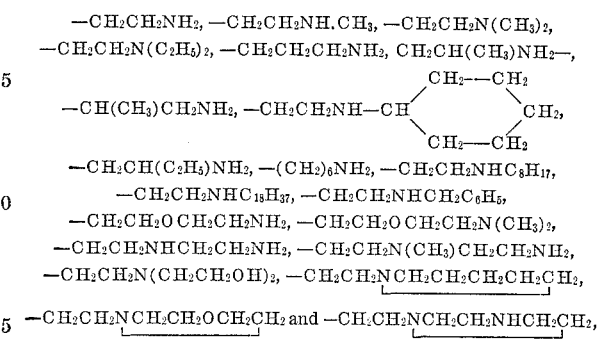

The aminoalkoxy silicon compound may be for example, an aminoalkoxy silane, an amino-alkoxydisilane, an amino-alkylsilicate, an amino-alkyl polysilicate, an aminoalkoxy organopolysiloxane, an amino-alkoxy silphenylene or an amino-alkoxysilmethylene. Suitable compounds include, for example,

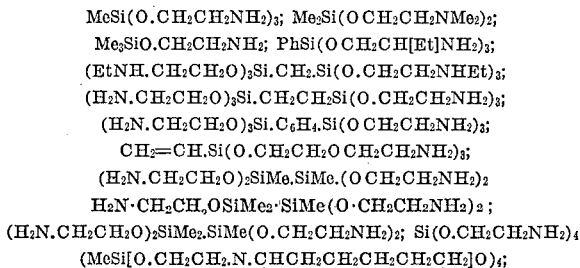

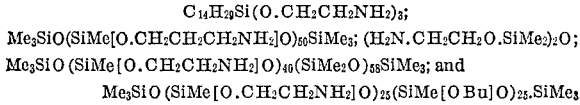

Me₃SiO(SiMe[O.CH₂CH₂CH₂NH₂]O)₅₀SiMe₃; (H₂N.CH₂CH₂O.SiMe₂)₂O;
Me₃SiO(SiMe[O.CH₂CH₂NH₂]O)₄₀(SiMe₂O)₅₈SiMe₃; and Me₃SiO(SiMe[O.CH₂CH₂NH₂]O)₂₅(SiMe[OBu]O)₂₅SiMe₃

The preferred aminoalkoxy silicon compounds are those of average general formula $$R^{iv}{}_a(R'R''NRO)_bSiO_{\frac{4-a-b}{2}}$$

where $R^{iv}$ is a hydrocarbyl or hydrocarbyloxy group, R, R' and R'' are as defined above, $a$ is any number from 0 to 2, $b$ is any number from 0.1 to 4, $a+b$ is not greater than 4 and not less than 1.95, and the total number of carbon atoms in the groups R, R', R'', and $R^{iv}$ is not greater than 24. The group $R^{iv}$ may be alkyl, aryl, aralkyl, alkaryl, alkenyl, alkoxy, aryloxy, aralkyloxy or such groups containing substituents. Suitable groups include, for example, methyl, ethyl, vinyl, phenyl, chlorophenyl, fluoropropyl, benzyl, tolyl, methoxy, ethoxy, butoxy and phenoxy groups.

In general the most preferred aminoalkoxy silicon compounds are the aminoethoxymethylpolysiloxanes, where $R^{iv}$ is a methyl group, $a$ is 1.0 to 1.8, $b$ is 0.3 to 1.0 and $a+b$ is not less than 2.0.

When the amino-alkoxy compound is an amino-alkoxypolysiloxane this may be prepared in any one of a variety of ways. In one method an amino-alcohol is reacted with an organopolysiloxane containing a proportion of silicon-bonded hydrogen atoms, preferably one of viscosity not greater than 1000 cs. at 25° C. Amino-alcohols which may be used for this process include, for example, 2-aminoethanol, 1-aminopropan-2-ol, 2-aminopropan-1-ol, 3-aminopropan-1-ol, 2-amino-2-methylpropan-2-ol, 2-aminobutan-1-ol, 2-methylaminoethanol, aminooctanol, aminooctadecanol, 2-(N,N-diethylamino)ethanol, 2-(2-aminoethoxy)-ethanol, 2-(2-aminoethylamino)-ethanol, N-(2-hydroxyethyl)-cyclohexylamine and 2-(N-benzylamino)ethanol. Organopolysiloxanes which may be used for the preparation of the amino-alkoxypolysiloxanes by this method include, for example, tetramethyldisiloxane, tetramethylcyclotetrasiloxane, pentamethylcyclopentasiloxane, tetramethylcyclotetrasiloxane, hexamethylcyclohexasiloxane and those of average general formula, Me₃SiO(MeHSiO)₃(Me₂SiO)₁₅SiMe₃
Me₃SiO(MeHSiO)₄₀(Me₂SiO)₅₈SiMe₃
Me₃SiO(MeHSiO)₅₀SiMe₃
Me₃SiO(MeHSiO)₂₅[Me(OBu)SiO]₂₅SiMe₃
and
Me₃SiO(MeHSiO)₄₀[Me(OEt)SiO]₁₀SiMe₃

Another convenient method of producing the amino-alkoxypolysiloxanes is by transesterification of an alkoxypolysiloxane with an aminoalcohol. Such transesterification can be carried out very readily at elevated temperatures at which the displaced alcohol distils from the reaction mixture.

A further method of producing the aminoalkoxypolysiloxanes is by the controlled hydrolysis of an organo(aminoalkoxy)silane either alone or with an aminoalkyl silicate.

When the aminoalkoxy compound is a silane, disilane, silmethylene, silethylene, silphenylene, silicate or polysilicate it can conveniently be prepared by transesterification of a suitable silicon alkoxy compound with the desired aminoalcohol.

The organotin acylate may be used in amount up to 20 parts by weight. It is in general preferred that it should be of the general formula.

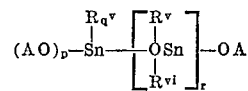

Where A is an acyl group, $R^v$ and $R^{vi}$, which may or may not be alike, are hydrocarbyl groups, preferably alkyl groups, $p$ is 1 or 2, $q$ is 1 or 2, $p+q$ equals 3 and $r$ is 0, 1 or 2. In many cases it preferred to use a diorganotin diacylate and while the groups $R^v$ and $R^{vi}$ are in general preferred to be alkyl groups, it is in many cases also preferred that they be butyl or octyl groups. It is also preferred that the acyl group A be aliphatic, for example, such as a lauroyl, octoyl, 2-ethyl-n-hexoyl, butyroyl, propionyl, acetyl, or formyl group. In many cases it is also preferred that the acyl groups have not more than five carbon atoms. Particular tin acylates preferred for many purposes include, dibutyltin diformate, dibutyltin diacetate, dibutyltin dipropionate, di-n-octyltin diformate, di-n-octyltin diacetate and di-n-octyltin dipropionate. The acylates which may be used also include the acyloxystannoxanes such as, for example, di-acetoxy tetrabutyldistannoxane, diformoxytetrabutyldistannoxane, and diacetoxytetraoctyldistannoxane. These may be prepared by reacting the appropriate organotin oxide with a carboxylic acid and removing the water formed during the reaction.

Other suitable tin acylates include, for example, butyltin triacetate and n-octyltin triacetate. In applications where the treated article may be subjected to rubbing immediately after curing, it is preferred to use a lower alkyl acylate such as, for example, dibutyltin di-propionate, dibutyltin diacetate, dibutyltin diformate, dioctyltin diacetate or dioctyltin diformate, since this gives an immediate non-smear surface irrespective of whether the treating bath is freshly prepared or not. This non-smear surface can be achieved by heating for as little as 30 seconds at 110–120° C. In cases where a higher acylate such as an octoate is used immediate non-smearing can be achieved only by using the treating bath within some 10 to 15 minutes of preparation. The smearing surface given by an aged solution will, however, be converted to a non-smear non-pilling film in from 15 to 60 minutes after curing. In cases where low temperature curing is specially desired it is preferred to use diacetoxydibutyldistannoxane or diacetoxydioctyldistannoxane.

The compositions can be cured to hard abrasion-resistant adhesive films by exposure to temperatures of 150° C. or higher, for a few seconds or to lower temperatures for longer periods, for example, some 15 seconds at 120° C. or about 1 minute at 90° C. The temperature selected for curing will, of course, depend on the application for which the compositions is being used and the speed of curing can be varied widely by varying the nature and proportions of the constituents. Thus these compositions can be used and are particularly valuable for use in processes such as paper treating which can be carried out continuously at high speeds, for example, speeds of up to 500 ft./minute can be used where it is possible to give a dwell time of some 15–30 seconds in a heating zone at 110–120° C.

The compositions can also be used to form abhesive films on a wide variety of other substrates, for example, on polyolefin or polyester films such as polypropylene or polyethyleneterephthalate, metals such as aluminium, glass and ceramics.

Our invention is further illustrated by the following examples in which all parts and percentages are by weight.

EXAMPLE 1

100 parts of a toluene solution of 10 parts of linear hydroxyl-ended dimethylpolysiloxane of viscosity $10^7$ cs. at 25° C., 0.6 part of a linear trimethylsilyl-ended methylpolysiloxane of viscosity 20 cs. at 25° C. and Me/Si ratio 1.08:1, 1.1 parts of the 50 percent solution in toluene of an aminobutoxypolysiloxane prepared as described hereinafter and 7.7 parts of a 10 percent solution of dibutyltin diacetate in toluene were mixed together.

A vegetable parchment paper was coated with the so prepared solution to give a weight of silicone deposited of 0.7–1.0 g./m.², and the coating cured in a forced draught air oven at 120° C. for 30 seconds. The silicone film so obtained was very resistant to rubbing with the finger, did not smear when so rubbed and possessed excellent release properties, particularly towards pressure sensitive adhesives.

A laminate of the silicone coated paper and label paper backed with a pressure sensitive adhesive was kept under a load of 1 p.s.i. at a relative humidity of 80 percent and a temperature of 60° C. for 6 days. The force required to separate an inch wide strip of the laminated paper was 18 g. The so separated adhesive coated paper strip was applied to a clean steel plate and left at 22° C. for 30 minutes. A load of 200 g. was required to peel the strip from the steel plate.

For purposes of comparison a similar composition made from the same materials but excluding the aminobutoxypolysiloxane was likewise coated on vegetable parchment paper and cured in the same oven at 120° C. for periods ranging from 30 seconds to 120 seconds. In all cases the silicone film exhibited severe rub-off upon rubbing with the finger.

Preparation of aminobutoxypolysiloxane

A mixture of 50 parts of a linear methylpolysiloxane of viscosity 20 cs. at 25° C. prepared by the cohydrolysis of 3.5 parts of trimethylchlorosilane and 96.5 parts of methyldichlorosilane, 75 parts of 2-aminobutan-1-ol and 125 parts of toluene were stirred together at 22° C. A vigorous evolution of hydrogen ensued and the solution became warm. After 8 hours almost the theoretical volume of hydrogen expected according to the following equation had been evolved and the evolution of hydrogen had almost ceased.

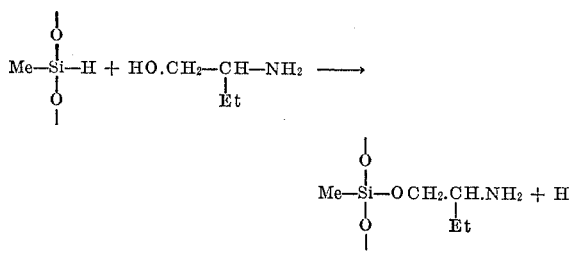

The clear 50 percent solution of product did not liberate hydrogen on further treatment with an oragnohydrogenpolysiloxane and the hydrochloride thereof had a N/Cl ratio of approximately 1:1.

EXAMPLE 2

A solution of composition similar to that of Example 1 was prepared using 0.9 part of a 50 percent solution of an aminoethoxypolysiloxane, prepared as described hereinafter, in place of the aminobutoxypolysiloxane. A non-smearing coating of excellent resistance to abrasion by finger rubbing was given by this solution when coated on a vegetable parchment paper and cured for only 15 seconds at 120° C. Paper coated with the same solution 4 hours after mixing together the ingredients behaved in a similar manner. An inch wide paper strip, coated with a pressure sensitive adhesive on one side, was placed against the silicone coated paper and kept under a load of ¼ p.s.i. for 1 day at 22° C. A pull of only 10 g. was required to effect separation of the laminate and the so separated adhesive paper strip required a load of 2100 g. to effect removal from a steel plate, showing that the silicone coated paper possessed excellent release properties without impairing the tack of the pressure sensitive adhesive.

Preparation of amino-ethoxypolysiloxane

A mixture of 122 parts of ethanolamine and 122 parts of toluene was stirred at 22° C. and 120 parts of the linear methylpolysiloxane used for the preparation of the aminobutoxypolysiloxane used in Example 1 added slowly thereto over a period of 2 hours. A vigorous evolution of hydrogen ensued and the reaction mixture became warm. A further 120 parts of toluene were added after completion of the addition of the methylpolysiloxane and the mixture stirred for a further 3 hours. The solution so obtained contained 50 percent of the aminoethoxypolysiloxane.

EXAMPLE 3

A solution of 100 parts of the diorganopolysiloxane used in Example 1, 6 parts of the methylpolysiloxane used in Example 1, 4.4 parts of the aminobutoxypolysiloxane used in Example 1 and 7 parts of dibutyltin dipropionate in 980 parts of toluene was coated on vegetable parchment. A non-smearing adhesive surface of excellent abrasion resistance was obtained after heating the coated paper at 120° C. for 30 seconds.

EXAMPLE 4

A solution of 100 parts of the dimethylpolysiloxane used in Example 1, 6 parts of the methylpolysiloxane used in Example 1, 5 parts of N-methylamine-ethoxypolysiloxane, prepared as hereinafter described and 7 parts of dibutyltin di-acetate in 1000 parts of toluene was coated on a vegetable parchment. The coating was cured for 30 seconds at 120° C. to give a highly abrasion-resistant abhesive surface.

Preparation of N-methylamino-ethoxypolysiloxane 26.3 parts of N-methylethanolamine were added slowly with stirring to 21.7 parts of the linear methylpolysiloxane used in the preparation of the aminobutyoxypolysiloxane of Example 1. The temperature of the reaction mixture was maintained at 80° C. or below by controlling the rate of addition of the aminoalcohol. The expected amount of hydrogen was liberated within 2 hours. The N-methylamino-ethoxypolysiloxane so obtained was a clear mobile liquid.

EXAMPLE 5

100 parts of the hydroxy ended dimethylpolysiloxane and 6 parts of the methylpolysiloxane used in Example 1, 8 parts of a polysilicate ester of 2-aminobutanol and 7 parts of dibutyltin di-acetate were dissolved in 1,080 parts of toluene.

A vegetable parchment paper was coated with the so prepared solution and thereafter cured by heating for 30 seconds at 120° C. to give an abhesive coating of high abrasion resistance.

The polysilicate ester was prepared by heating together under reflux, 18.6 parts of ethyl polysilicate and 26.7 parts of 2-aminobutanol. 12.5 parts of ethanol liberated during the reaction were removed by distillation.

EXAMPLE 6

100 parts of the hydroxy ended dimethylpolysiloxane and 6 parts of the methylpolysiloxane used in Example 1, 7 parts of tetra(2-amino-ethoxy)silane and 7 parts of dibutyltin di-acetate were dissolved in 1,080 parts of toluene.

A vegetable parchment paper was coated with the so prepared solution and thereafter cured by heating for 30 seconds at 120° C. to give an abhesive coating of high abrasion resistance.

The tetra(2-amino-ethoxy)silane was prepared by heating together under reflux, 40.2 parts of tetraethyl silicate and 48.8 parts of 2-amino-ethanol. 36 parts of ethanol liberated during the reaction were removed by distillation.

EXAMPLE 7

100 parts of the hydroxy ended dimethylpolysiloxane and 6 parts of the methylpolysilozane used in Example 1, 6.5 parts of methyl tri(2 - amino - ethoxy)silane and 7 parts of dibutyltin di-acetate were dissolved in 1,075 parts of toluene.

A vegetable parchment paper was coated with the so prepared solution and thereafter cured by heating for 30 seconds at 120° C. to give an abhesive coating of high abrasion resistance.

The methyl tri(2 - amino - ethoxy)silane was prepared by heating together under reflux, 35.6 parts of methyltriethoxysilane and 36.6 parts of 2-amino-ethanol. 27 parts of ethanol liberated during the reaction were removed by distillation.

EXAMPLE 8

Three solutions were made up by mixing together 100 parts of the hydroxy-ended dimethyl polysiloxane used in Example 1. 6 parts of the amino-ethoxy polysilozane used in Example 2, 7 parts of dibutyltin diacetate, 1100 parts of toluene and a proportion of a methylpolysiloxane, 6 parts of polysiloxane A, 20 parts of polysiloxane B and 20 parts of polysiloxane C were used respectively in the three solutions.

Polysiloxane A was a mixture composed essentially of cyclic methyl-siloxanes $(MeHSiO)_n$ where $n$ equals 4 to 6, and was prepared by thermal cracking of the product of hydrolysis of methyl dichlorosilane.

Polysiloxane B was a liquid of average composition $Me_3SiO(MeHSiO)_{40}(Me_2SiO)_{58}SiMe_3$ obtained by hydrolysing a mixture of 1.75 parts of trimethylchlorosilane, 37.4 parts of methyldichlorosilane and 60.8 parts of dimethyldichlorosilane.

Polysiloxane C was a liquid of average composition $Me_3SiO(MeHSiO)_{24}(Me_2SiO)_{34}SiMe_3$ prepared by hydrolysing a mixture of 2.9 parts of trimethyl chlorosilane, 37.5 parts of methyldichlorosilane and 59.6 parts of dimethyldichlorosilane.

The three solutions were used to coat vegetable parchment paper and the coated paper cured for 15–30 seconds at 120° C. The coatings were highly abrasion resistant abhesive coatings and gave excellent release of pressure sensitive adhesive.

EXAMPLE 9

Two solutions were prepared containing 100 parts of a hydroxy-ended dimethylpolysiloxane, 6 parts of the methylpolysiloxane used in Example 1, 6 parts of the aminoethoxypolysiloxane used in Example 2, and 7 parts of dibutyltin diacetate in 1100 parts of toluene. The hydroxy-ended siloxanes used in the solutions were respectively of viscosity 60,000 cs. at 25° C. and 4000 cs. at 25° C.

Vegetable parchment paper was coated with the solutions and in both cases there was obtained an abrasion resistant abhesive coating after curing in air at 120° C. for 15 seconds.

The solution containing the lower viscosity hydroxy-ended siloxane gelled within 1 hour and was no longer usable but the other solution remained usable for over 5 hours and still retained its rapid curing properties.

EXAMPLE 10

Eight 50 percent solutions of aminoalkoxysiloxanes in toluene were prepared from aminoalcohols and methylpolysiloxanes as follows:

In the preparation of Solutions 1 to 7 the polysiloxane was added slowly to the mixture of aminoalcohol and toluene. When the evolution of hydrogen had subsided the mixtures were heated at 80° C. for 3 hours. In the case of Solution 8 the butanol and ⅓ of the aminobutanol were first reacted with the polysiloxane at 80° C. until hydrogen evolution had ceased. The remainder of the aminobutanol was then added and heating continued until no further hydrogen was evolved. The components used were as follows:

Solution 1.—6.3 parts of the methylpolysiloxane used in Example 1, 11.7 parts of 2(diethylamino)ethanol and 18 parts of toluene.

Solution 2.—6.3 parts of the methylpolysiloxane used in Example 1, 10.5 parts of 2-(2-aminoethoxy)ethanol and 16.8 parts of toluene.

Solution 3.—3.3 parts of cyclic methylpolysiloxane $(MeHSiO)_n$ where $n=4$ to 6, prepared by thermal cracking of the hydrolysis product of methyldichlorosilane, 4.9 parts of 2 - aminobutan - 1 - ol and 8.2 parts of toluene.

Solution 4.—10 parts of 1,1,3,3 - tetramethyldisiloxane, 13.5 parts of 2 - aminobutan - 1 - ol and 23.5 parts of toluene.

Solution 5.—10 parts of a liquid methylpolysiloxane of average composition

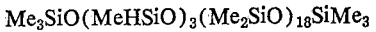

prepared by the hydrolysis of a mixture of 2.17 parts of trimethylchlorosilane, 3.45 parts of methyl dichlorosilane and 23.2 parts of dimethyldichlorosilane, 1.7 parts of 2-aminobutan - 1 - ol, 0.1 part of potassium trimethylsilanolate and 11.7 parts of toluene.

Solution 6.—6.3 parts of the methylpolysiloxane used in Example 1, 7.5 parts of 3-aminopropan-1-ol and 13.8 parts of toluene.

Solution 7.—25 parts of a methylpolysiloxane fluid of average composition

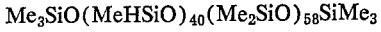

13 parts of 2-aminobutan-1-ol and 38 parts of toluene.

Solution 8.—5 parts of the methylpolysiloxane used in Example 1, 3.12 parts of n-butanol, 3.7 parts of 2-aminobutan-1-ol and 11.8 parts of toluene.

Eight solutions were prepared each containing 100 parts of the hydroxy-ended dimethylpolysiloxane and six parts of the liquid methylpolysiloxane used in Example 1 in 1060 parts of toluene. To five of these solutions (A–E) were added 6 parts of dibutyltin diacetate and to the remaining three solutions F, G and H, were added 11 parts of dibutyltin dioctoate.

Compositions were then prepared by mixing one of the eight solutions A' to H' obtained by adding the tin compound to solutions A to H to a proportion of one of the solutions 1 to 8, the proportion and solutions being as shown in Table I below.

TABLE I

| Catalysed polysiloxane solution | Aminoalkoxy silicon compound solution | |
|---|---|---|
| | No. | Parts |
| A' | 1 | 20 |
| B' | 2 | 10 |
| C' | 3 | 12 |
| D' | 4 | 12 |
| E' | 5 | 34 |
| F' | 6 | 11 |
| G' | 7 | 30 |
| H' | 8 | 24 |

The first five compositions all gave highly abrasion resistant films when vegetable parchment paper was coated therewith and the composition cured at 120° C. for 30 seconds. The so-prepared coatings were also non-smear immediately after cure when the compositions were several hours old. The remaining compositions all gave non-smearing films with good abrasion resistance when used in a similar manner and used when fresh. When these latter compositions were used more than one hour after preparation a tendency to smear was exhibited. This smear, however, disappeared within 30 minutes to leave a highly abrasive resistant abhesive coating.

EXAMPLE 11

Eight solutions (I to P) were prepared containing 100 parts of the hydroxy-ended dimethylpolysiloxane and 6 parts of the methyl polysiloxane used in Example 1 in 1000 parts of toluene. To the solutions I to N there were added 6 parts, to solution O 4.5 parts and to solution P 3.0 parts respectively of the aminoethoxypolysiloxane used in Example 1. The mixtures I to P so obtained were then mixed with a tin acylate of the kind and amounts shown in Table II below.

TABLE II

| Mixture | Tin acylate | Parts |
| --- | --- | --- |
| I | Butyltin triacetate | 7.5 |
| J | Dibutyltin diformate | 6.0 |
| K | Dioctyltin diformate | 8.5 |
| L | Diacetoxytetrabutyldistannoxane | 12 |
| M | Diacetoxytetraoctyldistannoxane | 6 |
| N | Mixture of diacetoxytetrabutyldistannoxane and diacetoxyhexabutyltristannoxane. | 6.5 |
| O | Dioctyltin diacetate | 5 |
| P | Diacetoxytetrabutyldistannoxane | 5 |

Each of the eight compositions so obtained when coated on to vegetable parchment paper and treated at 120° C. for 30 seconds gave an abhesive abrasion resistant coating. In the cases of mixtures I to N curing at 120° C. for 15 seconds or at lower temperatures, e.g. 90° C. for 30 seconds, were adequate to produce non-smearing abrasion resistant films. Composition L was capable of being cured to such a film after 30 seconds at 70° C. Composition P, on the other hand, containing the same components, gave a smearing film when cured under such conditions. Thus it will be apparent that by variation of the proportion of the components of the compositions a wide range of individual requirements can be adequately met.

The stannoxanes used were prepared as follows:

Diacetoxytetrabutyldistannoxane 25 parts of dibutyltin oxide, 6 parts of acetic acid and 30 parts of toluene were heated under reflux. 1.0 part of water was distilled from the mixture as an azeotrope with toluene, and there remained in the solution the distannoxane as a 50 percent solution.

Mixture of distannoxane and tristannoxane 50 parts of dibutyltin oxide, 10 parts of acetic acid and 60 parts of toluene were heated under reflux. The water formed was removed as the azeotrope with toluene leaving a mixture of stannoxanes of average composition MeCOO [Sn(Bu)$_2$]$_{24}$COMe in the form of a 50 percent solution in toluene.

Diacetoxytetraoctyldistannoxane 25 parts of dioctyltinoxide, 4.2 parts of acetic acid and 29 parts of toluene were heated under reflux and the water formed removed as the azeotrope with toluene. The distannoxane crystallised from solution on cooling and 56 parts of toluene were added to give a 25 percent solution of the acylate.

What we claim is:

1. A curable composition comprising 100 parts by weight of a diorganopolysiloxane having at least 2 hydroxyl groups attached to different silicon atoms per molecule and of viscosity not less than 3000 cs. at 25° C., 1 to 20 parts by weight of a mono-organopolysiloxane of viscosity not greater than 1000 cs. at 25°C., the organo groups in the said siloxanes being selected from the group consisting of alkyl, aryl, aralkyl, alkaryl, alkenyl, and cycloalkenyl groups and such groups containing substituents selected from halogens and cyano groups, 1 to 20 parts by weight of an aminoalkoxy polysiloxane compound of the average general formula $$R_a^{iv}(R'R''NRO)_b SiO_{\frac{4-a-b}{2}}$$

where R$^{iv}$ is a hydrocarbyl or hydrocarbyloxy group, $a$ is a number from 0 to 2, $b$ is a number from 0.1 to 4, $a+b$ is not greater than 4 and not less than 1.95 and the total number of carbon atoms in the groups R, R', R" and R$^{iv}$ is not greater than 24, and where R is selected from the group consisting of alkylene groups and alkylene groups joined by one or more —NR'''— groups or oxygen atoms and the oxygen atom attached to silicon and the essential nitrogen atom is attached to different carbons atoms, R' and R", which may or may not be the same, are selected from the group consisting of hydrogen, alkyl, cycloalkyl, aminoalkyl and hydroxyalkyl groups and monovalent groups consisting of alkylene and alkyl groups joined by one or more —NR'''—groups or oxygen atoms and R''' is selected from the group consisting of hydrogen and alkyl groups having not more than 5 carbon atoms and 5 to 20 parts by weight of an organotin acylate in an organic solvent.

2. A composition according to claim 1 wherein the diorganopolysiloxane has a hydroxyl group attached to each terminal silicon atom on the chain and the organo groups are selected from the group consisting of ethyl, phenyl, vinyl, 3,3,3-trifluoropropyl and chlorophenyl groups.

3. A composition according to claim 1 wherein the monoorganopolysiloxane contains a proportion of diorganosiloxanyl units.

4. A composition according to claim 1 wherein the diorganopolysiloxane has a hydroxyl group attached to each terminal silicon atom on the chain, at least a major proportion of the organo groups in the diorganopolysiloxane are methyl groups and the organo groups in the mono-organopolysiloxane are selected from the group consisting of methyl, ethyl, phenyl, tolyl, benzyl and vinyl groups.

5. A composition according to claim 1 wherein the diorganopolysiloxane has a hydroxyl group attached to each terminal silicon atom on the chain, at least a major proportion of the organo groups in the diorganopolysiloxane are methyl groups and the mono-organopolysiloxane in a trimethylsilyl ended methylpolysiloxane.

6. A composition according to claim 1 wherein the aminoalkoxy group (R'R"NRO) is selected from the group consisting of 2-amino-ethoxy, 2-aminopropoxy, 3-aminopropoxy, 1-aminoisopropoxy, N-octadecylaminoethoxy, N-octylamino-ethoxy, 2-methylaminopropoxy, N-methyl-amino-ethoxy, 2-aminobutoxy, 2-N,N-diethyl-amino-ethoxy and 2 - (2 - amino-ethylamino) ethoxy groups.

7. A composition according to claim 1 wherein the organotin acylate is of the general formula

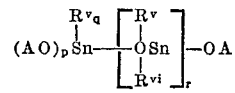

where A is an acyl group, R$^v$ and R$^{vi}$, which may or may not be alike, are hydrocarbyl groups, $p$ is 1 or 2, $q$ is 1 or 2, $p+q$ equals 3 and $r$ is 0, 1 or 2.

8. A composition according to claim 7 wherein the groups R$^v$ and R$^{vi}$ are alkyl groups and the groups A are aliphatic acyl groups.

9. A composition according to claim 7 wherein the groups R$^v$ and R$^{vi}$ are selected from the group consisting of butyl and octyl groups and the groups A are selected from the group consisting of lauroyl, octoyl, 2-ethyl-n-hexoyl, butyryl, propionyl, acetyl and formyl groups.

10. A composition according to claim 1 wherein the organotin acylate is an acyloxystannoxane.

References Cited

UNITED STATES PATENTS 3,436,251   4/1969   Rees _____ 260—825

SAMUEL H. BLECH, Primary Examiner

U.S. Cl. X.R.

117—123, 124, 132, 138.8, 155, 161; 161—209; 260—18, 33.6, 46.5, 429.7, 448.8